United States Patent
Lomax, Jr. et al.

(10) Patent No.: US 6,646,897 B1
(45) Date of Patent: Nov. 11, 2003

(54) METHOD AND SYSTEM OF SLOW OUTPUT VOLTAGE RAMP CONTROL FOR A POWER SUPPLY

(75) Inventors: Charles Weston Lomax, Jr., Raleigh, NC (US); Christopher Tad Ammann, Raleigh, NC (US)

(73) Assignee: ADC DCL Systems, Inc., Eden Prairie, MN (US)

(*) Notice: Subject to any disclaimer, the term of this patent is extended or adjusted under 35 U.S.C. 154(b) by 0 days.

(21) Appl. No.: 10/137,458

(22) Filed: Apr. 30, 2002

(51) Int. Cl.[7] .............................................. H02M 3/335
(52) U.S. Cl. ..................... 363/97; 363/21.09; 363/21.1; 363/21.17; 363/21.18
(58) Field of Search .......................... 363/21.09, 21.1, 363/21.11, 21.17, 21.18, 49, 97

(56) References Cited

U.S. PATENT DOCUMENTS

| | | | | |
|---|---|---|---|---|
| 4,504,898 A | * | 3/1985 | Pilukaitis et al. | 363/49 |
| 4,586,120 A | * | 4/1986 | Malik et al. | 363/49 |
| 4,996,638 A | * | 2/1991 | Orr | 363/97 |
| 5,060,131 A | * | 10/1991 | Sikora | 363/97 |
| 5,459,652 A | * | 10/1995 | Faulk | 363/49 |
| 6,009,000 A | * | 12/1999 | Siri | 363/21 |
| 6,125,046 A | * | 9/2000 | Jang et al. | 363/49 |
| 6,172,885 B1 | * | 1/2001 | Feldkeller | 363/21 |
| 6,392,906 B2 | * | 5/2002 | L'Hermite et al. | 363/21.11 |

* cited by examiner

*Primary Examiner*—Jeffrey Sterrett
(74) *Attorney, Agent, or Firm*—Fogg and Associates, LLC; Laura A. Ryan

(57) ABSTRACT

A pulse width modulation controller is coupled to a feedback voltage that is proportional to the power supply output voltage. The controller adjusts a current sense threshold in the controller in response to the feedback voltage. An offset voltage is generated for a predetermined time after the power-up of the power supply. A sum of the offset voltage and a primary current sense node voltage is applied to a current sense input of the controller. The controller generates a switch control signal in response to the sum voltage being less than the current sense threshold. The duty cycle of an output control switch is changed by the switch control signal thus adjusting the output voltage ramp.

22 Claims, 3 Drawing Sheets

METHOD AND SYSTEM OF SLOW OUTPUT VOLTAGE RAMP CONTROL FOR A POWER SUPPLY

TECHNICAL FIELD

The present invention relates generally to power supplies and particularly to power supply output control.

BACKGROUND

Integrated circuits typically have varying requirements for power supply voltages. Various integrated circuits may require different power supply voltage levels and different ramp-up times for the power supply voltages.

One method for controlling the ramp-up time for a power supply is to couple a pass transistor to the output of the power supply. The transistor turns on slowly, feeding current to the load at a reduced rate, while the power supply ramps up at a much quicker rate. Once the power supply output is at its maximum, the transistor appears as a short circuit to the power supply. However, transistors typically do not make a perfect short and, therefore, waste some power supply energy in the form of heat.

The heat dissipation of the pass transistor may be reduced by using a transistor that has a very low "on" resistance. These transistors are typically very expensive, thus adding to the cost of the power supply. There is a resulting need for a power supply that can economically control the ramp-up time of its output voltage without wasting power supply energy.

SUMMARY OF THE INVENTION

Embodiments of the present invention provide a slow output voltage ramp-up by controlling the output voltage ramp-up on the primary side of the power supply's transformer. The power supply comprises a feedback voltage that is coupled to the output voltage of the power supply. The feedback voltage is proportional to the output voltage.

A controller has a current sense input, a voltage feedback input, and a control output. The voltage feedback input is coupled to the feedback voltage and the controller adjusts a current sense threshold in response to the feedback voltage level. A control circuit apparatus is coupled to the current sense input of the controller. The control circuit apparatus comprises an offset voltage generator and a timer controlled switch coupled to the offset voltage generator. The timer-controlled switch applies the offset voltage to the current sense input during a predetermined time interval set by the current sense threshold. This turns the control output on during the predetermined time interval. An output control switch is coupled to the control output. The switch turns on when the control output is on.

DETAILED DESCRIPTION

Embodiments of the present invention provide a power supply output voltage ramp control circuit apparatus with a slow output ramp-up while not using energy consuming control circuits on the output. This is accomplished by controlling the output voltage ramp-up on the primary side of the power supply's transformer.

Figure 1:
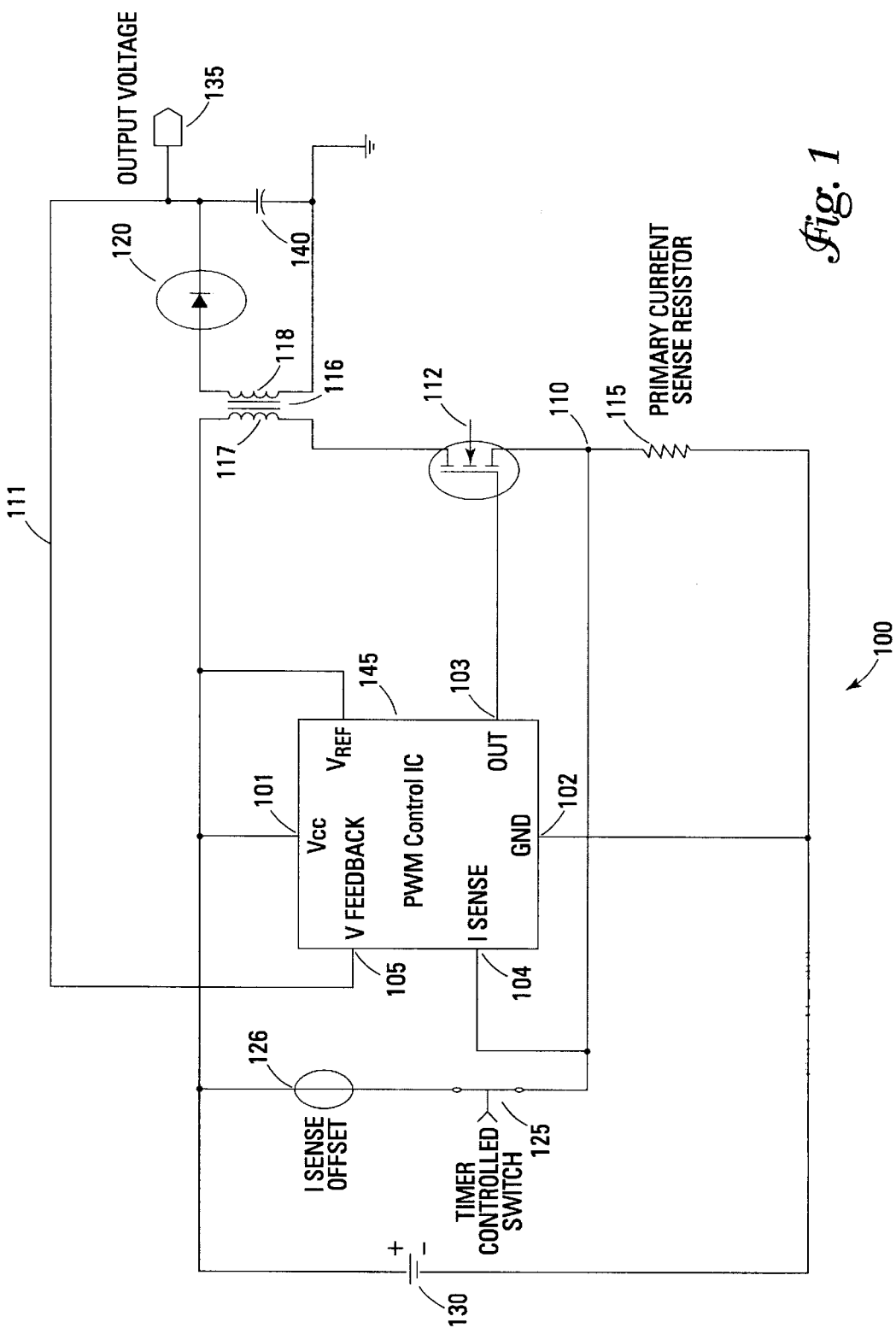
FIG. 1 shows a block diagram of one embodiment of a power supply of the present invention.

FIG. 1 illustrates a block diagram of one embodiment of a power supply (100). In this embodiment, the power supply outputs a regulated +5 VDC voltage. Alternate embodiments use other power supply outputs. The embodiments of the present invention are not limited to any one voltage output.

The power supply (100) is comprised of a pulse width modulation (PWM) controller (145) that provides control of the output voltage (135) of the power supply. In one embodiment, the PWM controller (145) functions are incorporated on an integrated circuit. An example of such a PWM controller is UCC2813 Low Power Economy BiCMOS Current Mode PWM manufactured by UNITRODE. This part is for purposes of illustration only and does not limit the embodiments of the present invention to this particular part.

As is well known in the art, PWM is a method for modulating the duty cycle of a square wave to encode a specific analog signal level. The voltage or current source is supplied to a load by means of a repeating series of on and off pulses. The on time is the time during which the DC supply is applied to the load and the off time is the time period during which the DC supply is not applied to the load. Since PWM is well known in the art, it is not discussed further herein.

In one embodiment, a 100 kHz modulating frequency is used. The embodiments of the present invention, however, are not limited to any one operating frequency. Alternate embodiments use different modulating frequencies and still remain within the scope of the embodiments of the present invention.

The PWM controller (145) has a power supply input (101) referred to as $V_{cc}$ to which a predetermined supply voltage is applied. In one embodiment, this supply voltage is +5V above the ground pin. Alternate embodiments use other supply voltage levels.

The PWM controller's (145) ground pin (102), in one embodiment, is tied to −48V. Alternate e Embodiments use other ground potentials. The voltage between $V_{cc}$ and GND, which is the circuit's input voltage, is represented in FIG. 1 as a voltage source (130).

The PWM controller (145) is further comprised of an "ISENSE" input (104). The ISENSE input (104) is a current sense input that is used to control the output of the PWM controller based on the voltage applied to this input. If the voltage that is applied to the ISENSE input (104) is less than a threshold, the output (103) of the PWM controller (145) goes substantially close to Vcc. If the voltage that is applied to the ISENSE input (104) is greater than the threshold, the output (103) of the PWM controller (145) is off or substantially close to 0V.

A "VFEEDBACK" input (105) of the PWM controller (145) is used to adjust the current sense threshold. The lower the voltage that is applied to the VFEEDBACK input (105), the higher the current sense threshold. The higher the voltage that is applied to the VFEEDBACK input (105), the lower the current sense threshold.

In operation, the output (103) of the PWM controller (145), in response to the ISENSE input (104) voltage, controls the operation of a transistor (112) that acts as an output control switch. The output of the PWM controller (145) is coupled to the gate of the transistor (112). A voltage of approximately Vcc from the PWM controller (145), when the controller output (103) is on, turns on the transistor (112). The on time of the transistor (112) sets the duty cycle of the power supply (100).

In one embodiment, the transistor (112) is a field effect transistor (FET). Alternate embodiments may use other types of transistors in place of the FET.

When this transistor (112) is turned on by the PWM controller (145), energy is stored in the primary (117) winding of the transformer (116). When the transistor is turned off, energy is released from the secondary (118) winding of the transformer (116) and is transferred to the power supply output (135) and the load (140). A diode (120) may be used on the output of the secondary (118) side of the transformer (116) to act as a rectifier for the output signal. This implementation of a power supply is commonly referred to as a "Flyback". The embodiments of the present invention are not limited to any of these elements. Other circuits may perform substantially the same function as the transformers, capacitors, and diodes illustrated in FIG. 1.

When the transistor (112) is turned on, a current sense node (110) voltage is generated across a primary current sense resistor (115). The node voltage (110) is the ISENSE input to the PWM controller (145). This voltage increases until it reaches a threshold set by the PWM controller (145) via a feedback voltage.

The threshold set by the PWM controller (145) is varied based on a feedback voltage (111) that is fed back from the power supply output (135). The feedback voltage (111) is input to the "VFEEDBACK" input (105) of the PWM controller (145).

Since the power supply of is attempting to regulate the output voltage at +5V, the feedback voltage (111) is used by the PWM controller (145) to regulate the output. If the feedback voltage (111) goes below a predetermined voltage, the current threshold is increased. In one embodiment, this predetermined voltage may be 4.5V. If the feedback voltage (111) goes above a predetermined voltage, the current threshold is decreased. In one embodiment, this predetermined voltage may be 5.0V. The PWM controller (145) adjusts the ISENSE limit on every cycle of the output signal (e.g., every 10 microseconds in one embodiment) in order to regulate the feedback voltage.

When the power supply is first powered-up, VFEEDBACK is zero. This causes the highest possible limit to be set for ISENSE. In one embodiment, the limit is 1 Volt. If left uncontrolled, the output of the power supply will ramp-up quickly to its maximum value. The ramp control circuit apparatus of the present invention artificially raises the ISENSE voltage at power-up in order to control the ramp-up of the output voltage by bringing the ISENSE node closer to the 1V limit.

The ramp control circuit apparatus is comprised of an ISENSE offset voltage (126) that is selectively applied to the ISENSE input (104) of the PWM controller (145). A timer-controlled switch (125) selectively applies the ISENSE offset voltage (126) to the ISENSE input (104). In one embodiment, the ISENSE offset voltage is +0.45V. Alternate embodiments use different offset voltages, depending on the implementation and speed of output voltage ramp-up desired.

In one embodiment, the timer portion of the timer-controlled switch is a resistor/capacitor network that has a certain RC time constant based on the values of these elements. The operation of this timer is discussed subsequently in greater detail with reference to the embodiment of FIG. 2.

The timer-controlled switch (125) is set to apply the offset voltage (126) only until the output voltage has ramped up to a desired value. The timer-controlled switch (125) may be set to open at a time that depends on the desired ramp-up speed of the output voltage. In one embodiment, the switch (125) is set to open in approximately 2 milliseconds in order to keep the output of the power supply from ramping up from 0 to +5 V in less than 2 milliseconds. Alternate embodiments use other times and other peak voltages, depending on the implementation.

The ramp control circuit apparatus, in an alternate embodiment, may be used to generate two slopes for the output voltage (135) of the power supply. For example, the timer-controlled switch (125) may be set to open when the output voltage has reached half of its maximum value. When this mid-value is reached and the switch (125) opens, the output voltage ramps up at a quicker pace. This embodiment provides a double-sloped output voltage.

The ramp control apparatus does not use a pass transistor at the output of the power supply. Therefore, the prior art problem of too much heat dissipation does not arise.

Figure 2:
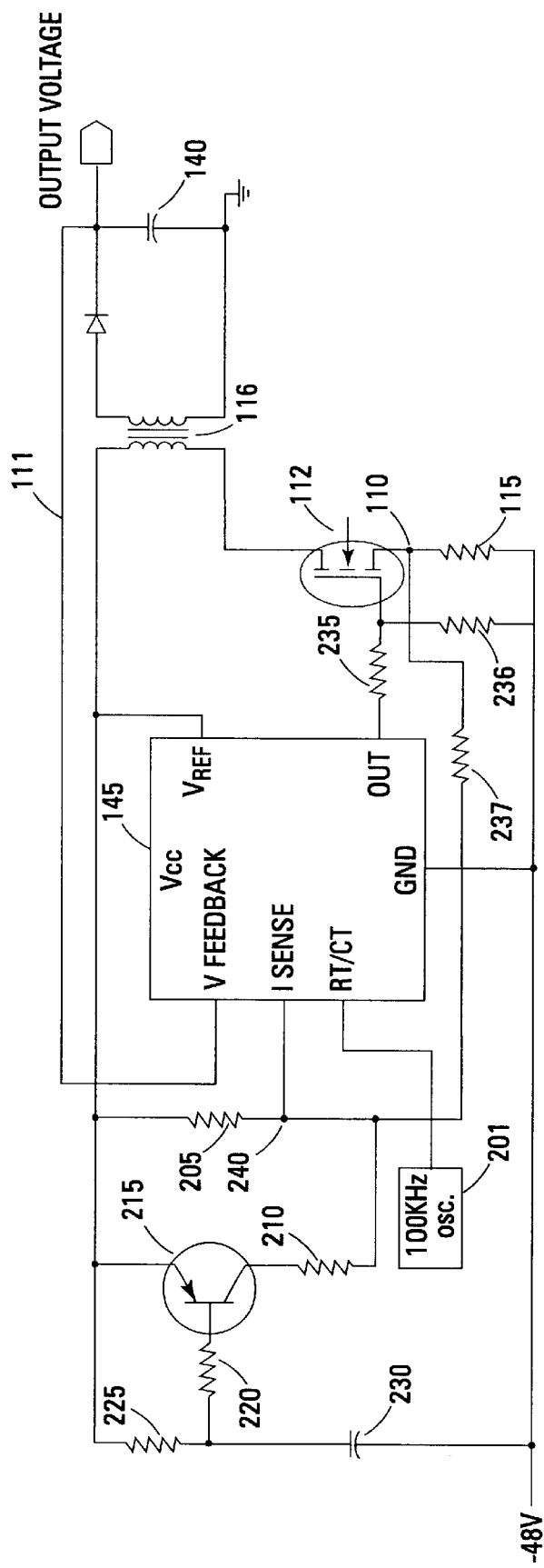
FIG. 2 shows a circuit schematic of one embodiment of the power supply output ramp control circuit apparatus in accordance with the power supply of FIG. 1.

FIG. 2 illustrates one embodiment for implementing the ramp control circuit apparatus of FIG. 1. This figure is for illustration purposes only since the embodiment illustrated in FIG. 1 may be implemented in multiple ways.

The embodiment of FIG. 2 is comprised of the PWM controller (145). The controller is coupled to a 100 kHz oscillator (201) that supplies the operating frequency for both the controller and the switch transistor (112). The transistor (112), therefore, turns on and off at the 100 kHz rate.

The output of the PWM controller (145) is coupled to the transistor's (112) gate through a resistor (235). Another resistor (236), tied to −48V, sets up a voltage divider to provide the proper turn-on voltage at the transistor's gate when the output of the PWM controller (145) is on.

When the PWM controller (145) is powered-up, the $V_{ref}$ input of the controller (145) becomes +5V above the ground input that is coupled to the −48V supply. When $V_{ref}$ becomes +5V, a capacitor (230) is charged through a resistor (225). Until the capacitor (230) is charged, the transistor (215) of the control circuit is on.

While the control circuit transistor (215) is on, it is going to apply a sum of an offset voltage and a node voltage (110) to the ISENSE input of the controller (145). This offset voltage is determined by a voltage divider circuit comprised of two resistors (210 and 237). In one embodiment these resistors have resistance values of 1 k Ohm and 10 k Ohm, respectively. With $V_{ref}$ as the voltage to be divided down, the offset voltage applied to the ISENSE input is 0.9V when the timer-controlled switch is on, rather than the normal operating offset level of 0.5V when the timer controlled switch is off. Alternate embodiments use other resistance values to generate the same or even a different offset voltage.

When the capacitor (230) of the control circuit apparatus is charged, the node at the biasing resistors (225 and 220) is such that the transistor (215) turns off. A resistor (205) is used to pull up the ISENSE input to $V_{ref}$ when the transistor (215) is off. This pull-up sets the overall limits on the primary side of the transformer (116).

With the transistor (215) off, the ISENSE input of the controller (145) only has the voltage across the pull-up resistor (205) applied. The artificially elevated ISENSE voltage is gone. The controller (145) is now free to regulate the supply output voltage across the output capacitor (140) in a normal fashion.

Another resistor (237) feeds in the primary current sense node (110) voltage from the primary current sense resistor (115). The primary current sense resistor (115) has a ramp voltage across it that is proportional to the primary current of the power supply.

The feedback voltage (111) from the power supply output, as described above, sets the current sense limit of the controller (145). If the feedback voltage is too low (e.g., 4.5V), meaning the output voltage of the supply is too low, a higher peak primary current will be allowed on the ISENSE input (i.e., the sense threshold is raised) so that the ramp voltage will go higher. This allows more energy to the transformer (116) and therefore more energy out of the transformer (116). This increases the output voltage.

If the feedback voltage is too high (e.g., 5.0V), the controller (145) lowers the sense threshold on the ISENSE input. This turns on the switch transistor (112) to allow the primary current to increase.

The output voltage ramp-up slope can be varied by changing elements of the control circuit apparatus. By changing the values of the resistor (225) and capacitor (230) in the control circuit, the point at which the transistor (215) turns off is changed. Thus, the point at which the power supply is allowed to ramp up naturally changes.

Figure 3:
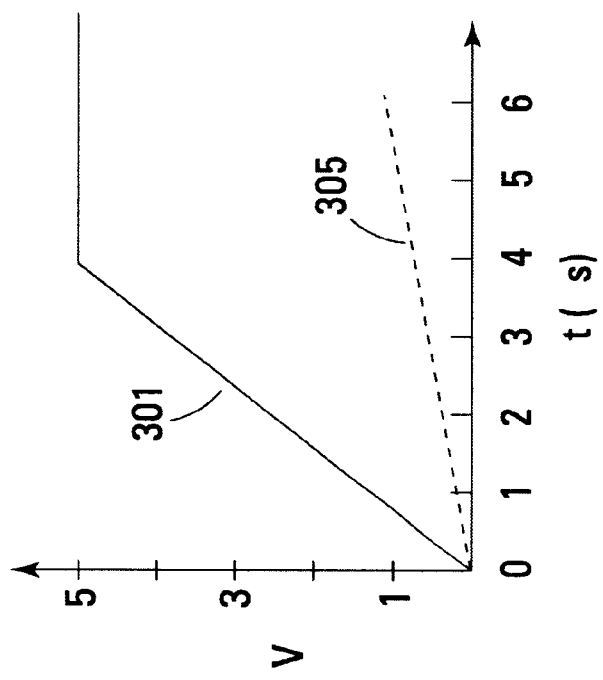
FIG. 3 shows a plot of an output voltage of a typical prior art power supply compared to an output voltage of the power supply of the present invention.

FIG. 3 illustrates a plot of an output of a typical power supply (301) without output voltage ramp control compared to an output voltage (305) with the output voltage ramp control. Without the control (301), the output voltage ramps up quickly from 0V to the power supply voltage maximum (e.g., +5V). This may occur as quickly as 2 to 5 microseconds.

With the ramp control circuit apparatus of the present invention, the output voltage (305) ramps up slowly. It may take one to two milliseconds to reach the regulated voltage of the supply.

Figure 4:
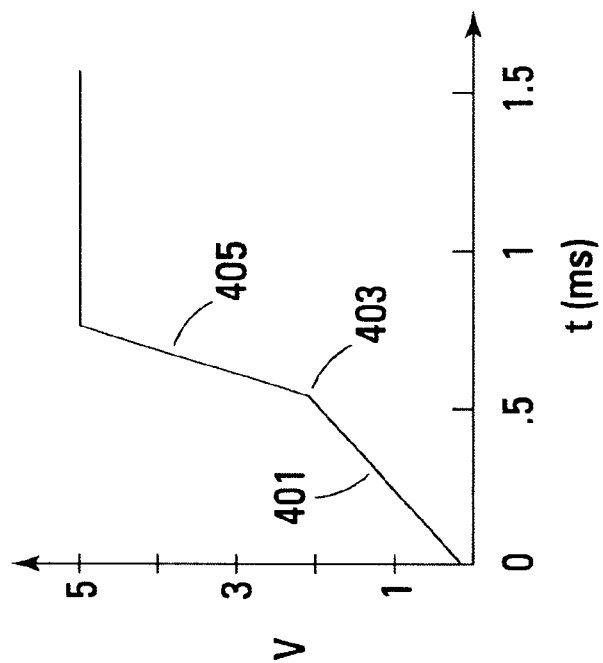
FIG. 4 shows a plot of an output voltage of the power supply of the present invention that provides a dual slope output voltage.

FIG. 4 illustrates a plot of an output of a power supply of the present invention with the output voltage ramp control circuit apparatus set to provide two output voltage slopes (401 and 405). With the control circuit transistor on and applying an artificially high voltage at the ISENSE input of the controller, the output voltage ramps up slowly (401) such that it may take one to two milliseconds to reach the regulated voltage of the supply. When the capacitor of the control circuit has charged and turned off the transistor (403), the output voltage ramps up (405) as fast as the power supply will allow.

In summary, the power supply output ramp control circuit apparatus of the present invention provides control of a power supply output. The control circuit apparatus may be set to provide a slow output voltage ramp-up or a multiple slope output voltage. This is accomplished without the need for expensive pass transistors or other elements connected to the power supply output that waste output power.

Numerous modifications and variations of the present invention are possible in light of the above teachings. It is therefore to be understood that within the scope of the appended claims, the invention may be practiced otherwise than as specifically described herein.

What is claimed is:

1. A power supply with output voltage ramp control, the power supply comprising:
   a controller having a current sense input, a voltage feedback input, and a control output, the voltage feedback input coupled to a feedback voltage that is proportional to the output voltage, the controller adjusting a current sense threshold in response to the feedback voltage;
   a control circuit apparatus coupled to the current sense input of the controller, the control circuit apparatus comprising:
     an offset voltage generator that generates an offset voltage during a predetermined time interval; and
     a timer controlled switch coupled to the offset voltage generator, the timer controlled switch having a capability for applying a sum voltage of the offset voltage and a node voltage, from a primary current sense node, to the current sense input such that the control output of the controller is on during the predetermined time interval; and
   an output control switch, coupled to the control output, that turns on when the control output is on.

2. The power supply of claim 1 wherein the output control switch is coupled to a primary side of a transformer such that when the output control switch is on, less energy is transferred from the primary side to the secondary side of the transformer.

3. The power supply of claim 1 wherein the controller is a current mode pulse width modulation controller.

4. The power supply of claim 1 wherein the output control switch is a field effect transistor with a gate input coupled to the control output.

5. The power supply of claim 1 wherein the offset voltage is provided by a voltage divider circuit coupled to a reference voltage that provides a reduced voltage at the timer controlled switch.

6. The power supply of claim 5 wherein the control output is substantially close to the reference voltage when the control output is on.

7. The power supply of claim 1 and further including an oscillator coupled to the controller, the oscillator generating a signal having a predetermined frequency.

8. The power supply of claim 7 wherein the output control switch turns on and off at the predetermined frequency and the control signal adjusts a duty cycle of the output control switch.

9. The power supply of claim 5 wherein the voltage divider circuit is comprised of a resistor that acts as a primary current sense resistor to generate the node voltage.

10. The power supply of claim 5 wherein the predetermined time interval begins at power-up of the power supply and ends when the reference voltage reaches a predetermined voltage level.

11. The power supply of claim 5 wherein the predetermined time interval begins at power-up of the power supply and ends prior to a time when the reference voltage reaches a predetermined voltage level.

12. The power supply of claim 1 wherein the timer controlled switch is a transistor coupled to a timer comprising a resistor and capacitor network wherein the resistor and capacitor network provides a predetermined shut-off voltage to the transistor after a time constant that is set by values of the resistor and capacitor.

13. In a power supply, an apparatus for controlling the slope of an output voltage, the apparatus comprising:
   a feedback voltage coupled to the output voltage, the feedback voltage being proportional to the output voltage;
   an oscillator that generates an oscillator signal having a predetermined frequency;
   a pulse width modulating controller having a current sense input, a voltage feedback input, an oscillator input, and a control output, the voltage feedback input coupled to the feedback voltage, the controller adjusting a current sense threshold in response to the feedback voltage, the oscillator input coupled to the oscillator signal;

a primary current sense node having a predetermined node voltage;

a control circuit apparatus coupled to the current sense input of the controller, the control circuit apparatus comprising:

an offset voltage generator comprising a current sense resistor that generates an offset voltage during a predetermined time interval; and a timer controlled switch coupled to the offset voltage generator, the timer controlled switch having a capability for applying a sum voltage of the offset voltage and the node voltage to the current sense input such that the control output of the controller is on during the predetermined time interval; and an output control switch, coupled to the control output, that turns on and off at a frequency that is substantially equal to the predetermined frequency and the control output sets a time period that the output control switch is on.

14. The apparatus of claim 13 wherein the timer controlled switch is a transistor coupled to a timer comprising a resistor and capacitor network wherein the resistor and capacitor network provides a predetermined shut-off voltage to the transistor after a time constant that is set by values of the resistor and capacitor.

15. A method for controlling an output voltage ramp in a power supply, the method comprising:

coupling to a controller a feedback voltage that is proportional to the power supply output voltage;

adjusting a current sense threshold in the controller in response to the feedback voltage;

applying a sum voltage of an offset voltage and a node voltage to a current sense input of the controller;

the controller generating a switch control signal, the switch control signal indicating an on condition in response to the sum voltage being less than the current sense threshold; and an output control switch adjusting the output voltage ramp in response to the switch control signal.

16. The method of claim 15 and further including the step of generating an oscillator signal having a predetermined frequency, the oscillator signal being input to the controller.

17. The method of claim 16 and further including the step of adjusting the current sense threshold every cycle of the oscillator signal.

18. The method of claim 16 and further including the steps:

the output control switch turning on and off in response to the oscillator signal; and the switch control signal adjusting a duty cycle of the output control switch.

19. A power supply having an output voltage ramp-up with multiple, controllable slopes, the power supply comprising:

a feedback voltage coupled to the output voltage of the power supply, the feedback voltage being proportional to the output voltage;

a controller having a current sense input, a voltage feedback input, a reference voltage, and a control output, the voltage feedback input coupled to the feedback voltage, the controller adjusting a current sense threshold in response to the feedback voltage;

a primary current sense node having a predetermined node voltage;

a control circuit apparatus coupled to the current sense input of the controller, the control circuit apparatus comprising:

an offset voltage generator comprising a current sense resistor that generates an offset voltage during a predetermined time interval; and a timer that generates a switch shut-off voltage after the predetermined time interval, the predetermined time interval being less than a time for the reference voltage to reach a level that is substantially similar to the output voltage; and a timer controlled switch coupled to the offset voltage generator and the timer, the timer controlled switch having a capability for applying a sum of the offset voltage and the node voltage to the current sense input such that the control output of the controller is on during the predetermined time interval; and an output control switch, coupled to the control output, that turns on when the control output is on.

20. The power supply of claim 19 and further including an oscillator that generates an oscillator signal having a predetermined frequency, the predetermined frequency determining a frequency at which the output control switch operates and the control output determining a duty cycle of the output control switch.

21. A power supply with output voltage ramp control, the power supply comprising:

a control circuit apparatus for generating an offset voltage for a predetermined time interval;

a controller for generating an output control signal, the controller coupled to a primary current sense node and the control circuit apparatus, the controller adjusting a current sense threshold in response to a feedback voltage, that is proportional to the output voltage, and a sum of a primary current sense node voltage and the offset voltage; and an output control switch, coupled to the controller, that turns on in response to the output control signal to control the output voltage.

22. A method for controlling an output voltage ramp in a power supply, the method comprising:

coupling a feedback voltage that is proportional to the power supply output voltage;

adjusting a current sense threshold in response to the feedback voltage;

creating a sum voltage from an offset voltage and a current sense node voltage;

generating a switch control signal, the switch control signal indicating an on condition in response to the sum voltage being less than the current sense threshold; and adjusting the output voltage ramp in response to the switch control signal.

* * * * *

UNITED STATES PATENT AND TRADEMARK OFFICE
CERTIFICATE OF CORRECTION

PATENT NO. : 6,646,897 B1
DATED : November 11, 2003
INVENTOR(S) : Charles Weston Lomax, Jr. and Christopher Tad Ammann It is certified that error appears in the above-identified patent and that said Letters Patent is hereby corrected as shown below:

<u>Title page,</u>
Item [73], Assignee, please replace "ADC DCL Systems, Inc." with
-- ADC DSL Systems, Inc. --

Signed and Sealed this

Twentieth Day of January, 2004

JON W. DUDAS
*Acting Director of the United States Patent and Trademark Office*